(12) United States Patent
Ishikawa et al.

(10) Patent No.: US 12,244,501 B2
(45) Date of Patent: Mar. 4, 2025

(54) COMMUNICATION SYSTEM, SERVER, METHOD FOR CONTROLLING COMMUNICATION SYSTEM, AND NON-TRANSITORY STORAGE MEDIUM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/335,258

(22) Filed: Jun. 15, 2023

(65) Prior Publication Data
US 2024/0073142 A1    Feb. 29, 2024

(30) Foreign Application Priority Data
Aug. 29, 2022   (JP) ................................. 2022-136062

(51) Int. Cl.
*G06F 15/16* (2006.01)
*H04L 47/12* (2022.01)
*H04L 67/12* (2022.01)

(52) U.S. Cl.
CPC .............. *H04L 47/12* (2013.01); *H04L 67/12* (2013.01)

(58) Field of Classification Search
CPC ............................... H04L 47/12; H04L 67/12
See application file for complete search history.

(56) References Cited

U.S. PATENT DOCUMENTS

| | | | | |
|---|---|---|---|---|
| 2015/0242198 | A1* | 8/2015 | Tobolski | H04L 67/34 717/172 |
| 2015/0363210 | A1* | 12/2015 | Wehrman | G06F 8/65 701/31.5 |
| 2019/0166541 | A1* | 5/2019 | Feng | H04W 88/02 |
| 2020/0174778 | A1* | 6/2020 | David | H04W 4/80 |
| 2022/0253300 | A1* | 8/2022 | Yamada | B60W 50/06 |

FOREIGN PATENT DOCUMENTS

JP    2017-149323 A    8/2017

* cited by examiner

*Primary Examiner* — Normin Abedin
(74) *Attorney, Agent, or Firm* — Oblon, McClelland, Maier & Neustadt, L.L.P.

(57) ABSTRACT

A communication system includes a vehicle including a control device configured to store a control program, a terminal configured to give a notification about predetermined information, and a server configured to communicate with the vehicle and the terminal. The server is configured to transmit update data for the control program. The processor is configured to reduce a data amount of information to be transmitted to the terminal about a transmission status of the update data when the server transmits the update data to the vehicle via the terminal, as compared to a data amount of information to be transmitted to the terminal about the transmission status when the server transmits the update data to the vehicle without intermediation of the terminal.

5 Claims, 3 Drawing Sheets

COMMUNICATION SYSTEM, SERVER, METHOD FOR CONTROLLING COMMUNICATION SYSTEM, AND NON-TRANSITORY STORAGE MEDIUM

CROSS-REFERENCE TO RELATED APPLICATION

This application claims priority to Japanese Patent Application No. 2022-136062 filed on Aug. 29, 2022, incorporated herein by reference in its entirety.

BACKGROUND

1. Technical Field

The present disclosure relates to a communication system, a server, a method for controlling the communication system, and a non-transitory storage medium.

2. Description of Related Art

Vehicles include a control device that controls operations of various on-board electric devices. A control program of the control device is updated by using update data transmitted by wire. As another update method, a so-called over-the-air (OTA) technology may be used to update the control program by using update data received from an external server via wireless communication. When the control program is updated by using such an OTA technology, software (update data) is downloaded from the external server, for example, via an on-board communication device (for example, a data communication module (DCM)) or a terminal owned by a user (for example, a mobile phone such as a smartphone).

Japanese Unexamined Patent Application Publication No. 2017-149323 (JP 2017-149323 A) discloses, for example, a technology for requesting download of update software based on the location of an electronic key when a notification about software update is received from a server via a mobile device.

SUMMARY

When downloading the update data, the user is notified about the progress of the download. When similar download progress notifications are given for cases where the software is downloaded from the external server to the vehicle control device via the on-board communication device and where the software is downloaded from the external server to the vehicle control device via the terminal owned by the user, unnecessary information may be transmitted to the terminal owned by the user about the download progress. Therefore, unnecessary communication occurs between the external server and the terminal owned by the user. As a result, the communication cost and the communication load may increase.

The present disclosure provides a communication system, a server, a method for controlling the communication system, and a non-transitory storage medium that reduce unnecessary communication for downloading update software, and reduce the communication load.

A communication system according to a first aspect of the present disclosure includes a vehicle including a control device configured to store a control program, a terminal configured to give a notification of predetermined information, and a server configured to communicate with the vehicle and the terminal. The server is configured to transmit update data for the control program. The server is configured to reduce a data amount of information to be transmitted to the terminal about a transmission status of the update data when the server transmits the update data to the vehicle via the terminal, as compared to a data amount of information to be transmitted to the terminal about the transmission status when the server transmits the update data to the vehicle without intermediation of the terminal. The server may be configured to transmit the information of which the data amount is reduced, to the terminal.

Therefore, in the case where the server transmits the update data to the vehicle via the terminal, the data amount of the information to be transmitted to the terminal (the data amount of the information about the transmission status) is reduced as compared to the case where the server transmits the update data to the vehicle without intermediation of the terminal. Thus, unnecessary communication can be reduced and the communication load can be reduced.

In the communication system according to the first aspect of the present disclosure, the server may be configured to transmit the information about the transmission status to the terminal when the server transmits the update data to the vehicle without intermediation of the terminal, and the server may be configured not to transmit the information about the transmission status to the terminal when the server transmits the update data to the vehicle via the terminal.

Therefore, in the case where the server transmits the update data to the vehicle via the terminal, the data amount of the information to be transmitted to the terminal can be reduced as compared to the case where the server transmits the update data to the vehicle without intermediation of the terminal.

In the communication system according to the first aspect of the present disclosure, the information about the transmission status may include at least one of information indicating completion of transmission of the update data and information indicating progress of the transmission of the update data.

By transmitting at least one of the information indicating the completion of the transmission of the update data and the information indicating the progress of the transmission of the update data to a user of the terminal, the progress of the transmission of the update data can be checked on the terminal.

A server according to a second aspect of the present disclosure includes one or more processors. The one or more processors are configured to communicate with a vehicle including a control device configured to store a control program and a terminal configured to give a notification of predetermined information, and transmit update data for the control program. The one or more processors are configured to reduce a data amount of information to be transmitted to the terminal about a transmission status of the update data when the one or more processors transmit the update data to the vehicle via the terminal, as compared to a data amount of information to be transmitted to the terminal about the transmission status when the one or more processors transmit the update data to the vehicle without intermediation of the terminal.

A method, according to a third aspect of the present disclosure, for controlling a communication system including, a vehicle including a control device configured to store a control program and a terminal configured to give a notification of predetermined information includes: transmitting update data for the control program; and reducing a data amount of information to be transmitted to the terminal about a transmission status of the update data when the update data is transmitted to the vehicle via the terminal, as compared to a data amount of information to be transmitted to the terminal about the transmission status when the update data is transmitted to the vehicle without intermediation of the terminal.

A non-transitory storage medium, according to a fourth aspect of the present disclosure, stores instructions that are executable by one or more processors mounted on the communication system and that cause the one or more processors to perform the method for controlling the communication system according to a third aspect of the present disclosure.

With the present disclosure, it is possible to provide the communication system, the server, the method for controlling the communication system, and the non-transitory storage medium in which unnecessary communication is reduced for downloading the update software to reduce the communication load.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding parts are denoted by the same signs throughout the drawings, and description thereof will not be repeated.

Figure 1:
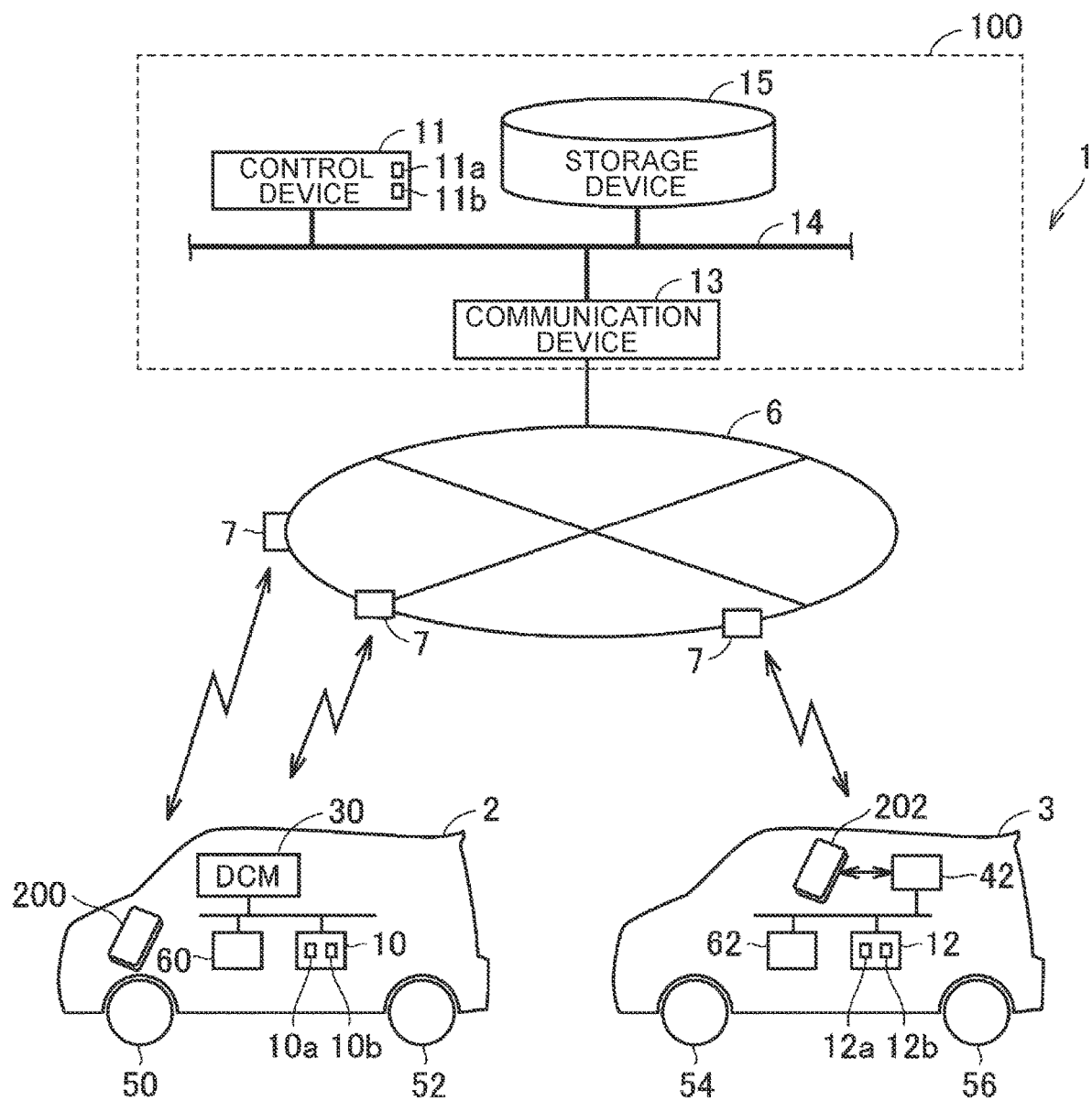
FIG. 1 illustrates an example of the configuration of a communication system.

FIG. 1 illustrates an example of the configuration of a communication system 1. As shown in FIG. 1, in the present embodiment, the communication system 1 includes a plurality of vehicles 2, 3, a communication network 6, base stations 7, a data center 100, and user terminals 200, 202.

The vehicles 2, 3 may be, for example, vehicles using engines as their drive sources. Alternatively, the vehicles 2, 3 may be battery electric vehicles using electric motors as their drive sources. The vehicles 2, 3 may be hybrid electric vehicles each including an engine and an electric motor and using at least one of them as a drive source. For convenience of description, only two vehicles 2, 3 are shown in FIG. 1. The number of vehicles is not particularly limited to two, and may be three or more. The number of vehicles may be one.

The communication system 1 acquires predetermined information from the vehicles 2, 3 configured to communicate with the data center 100, and is provided with predetermined information from the vehicles 2, 3. The communication system 1 is configured to manage acquired information and information to be provided.

The data center 100 includes a control device 11, a communication device 13, a storage device 15, and a communication bus 14. The control device 11, the communication device 13, and the storage device 15 are connected to each other via the communication bus 14 to communicate with each other. The data center 100 is an example of a "server" in the present embodiment.

The control device 11 includes a processor 11a such as a central processing unit (CPU) that executes programs, a memory 11b (such as a read-only memory (ROM) and a random access memory (RAM)), and an input and output port (not shown) for inputting and outputting various signals. Various types of control are performed by the control device 11 by software processing, that is, by the CPU 11a reading a program stored in the memory 11b. The various types of control that are performed by the control device 11 can also be implemented by a general-purpose computer (not shown) executing a program stored in a storage medium. The various types of control that are performed by the control device 11 need not be implemented by the software processing, and may be implemented by processing with dedicated hardware (electronic circuit).

The storage device 15 stores predetermined information on the vehicles 2, 3 configured to communicate with the data center 100. The predetermined information includes, for example, information on control programs for each vehicle 2 or 3 described later, and information for identifying each vehicle 2 or 3 (hereinafter referred to as "vehicle identification (ID)"). The vehicle ID is unique information set for each vehicle. The data center 100 can identify a transmitting vehicle or a receiving vehicle by the vehicle ID.

The communication device 13 implements bidirectional communication between the control device 11 and the communication network 6. The data center 100 can communicate with a plurality of vehicles including the vehicle 2 including a DCM 30 via the base stations 7 on the communication network 6 by using the communication device 13. The data center 100 can communicate with a plurality of vehicles including the vehicle 3 via the user terminal 202 and the base stations 7 on the communication network 6 by using the communication device 13. The vehicle 3 includes a short-range communication device 42 capable of communicating with the user terminal 202. The data center 100 can communicate with a plurality of user terminals including the user terminals 200, 202 via the base stations 7 on the communication network by using the communication device 13.

The user terminal 200 is, for example, a mobile terminal owned by a user of the vehicle 2, such as a smart phone, a tablet terminal, or a wearable device. The user terminal 200 is a computer (not shown) including a processor such as a CPU that executes programs, a memory, and an input and output interface. The user terminal 200 is configured to communicate with the data center 100 via the base station 7. The data center 100 stores, for example, the user terminal 200 and a vehicle ID of the vehicle 2 in association with each other.

The user terminal 202 is, for example, a mobile terminal owned by a user of the vehicle 3. The user terminal 202 has the same configuration as that of the user terminal 200 except that it can communicate with the short-range communication device 42 of the vehicle 3. Therefore, detailed description thereof will not be repeated.

Next, specific configurations of the vehicles 2, 3 will be described. The vehicle 2 includes driving wheels 50 and driven wheels 52. When the driving wheels 50 are rotated by an operation of the drive source, a driving force acts on the vehicle 2 and the vehicle 2 travels accordingly.

The vehicle 2 further includes an electronic control unit (ECU) 10, the data communication module (DCM) 30, and a navigation system 60.

The ECU 10 is a computer including a processor 10a such as a CPU that executes programs, a memory 10b, and an input and output interface (not shown). The ECU 10 includes various control programs for controlling various actuators mounted on the vehicle 2. The various control programs include, for example, control programs for at least one of steering control, drive control, and braking control. The various control programs may include, for example, a program for implementing a driving assistance system having functions related to driving assistance for the vehicle 2. The driving assistance system includes, for example, an autonomous driving system (AD), an automated parking system, and an advanced driver assist system (ADAS).

The DCM 30 is a communication module configured to perform bidirectional communication with the data center 100 via the communication network 6 and the base station 7.

The navigation system 60 includes a position detection device using, for example, Global Positioning System (GPS) satellites and a wireless local area network (LAN), a database storing map information, and a control device using a CPU or the like (none of which are shown). The position detection device identifies the position of the vehicle 2. The navigation system 60 determines a travel route on a map from a current position of the vehicle 2 to a destination, and provides guidance to guide the vehicle 2 traveling along the travel route to the destination. The navigation system 60 displays the map information and guidance information on a touch panel display (not shown), identifies a destination input by the user through the user's operation on a touch panel, and displays a plurality of travel route options to the identified destination.

The vehicle 3 includes driving wheels 54 and driven wheels 56. When the driving wheels 54 are rotated by an operation of the drive source, a driving force acts on the vehicle 3 and the vehicle 3 travels accordingly. The vehicle 3 further includes an ECU 12, the short-range communication device 42, and a navigation system 62.

The ECU 12 and the navigation system 62 have the same configurations as those of the ECU 10 and the navigation system 60, respectively. Therefore, detailed description of the ECU 12 and the navigation system 62 will not be repeated.

The short-range communication device 42 is configured to perform short-range communication with the user terminal 202. The short-range communication between the user terminal 202 and the short-range communication device 42 includes, for example, wireless communication based on a predetermined standard (for example, Wi-Fi (registered trademark) communication or Bluetooth (registered trademark) communication). The short-range communication device 42 is configured to communicate with the data center 100, for example, via the user terminal 202, the base station 7, and the communication network 6.

In the vehicles 2, 3 configured as described above, a so-called over-the-air (OTA) technology may be used for the ECU 10 to update, for example, any one of the various control programs stored in the memory. In the OTA technology, the control program is updated by using update information received from the data center 100 outside the vehicle 2 by wireless communication. With such an OTA technology, update programs can be provided even after the vehicle 2 has been put on the market. That is, functions of the control program can be modified or added even after the vehicle 2 has been put on the market.

When the control program is updated by using such an OTA technology, software is downloaded to the ECUs 10 and 12 from the data center 100 that is a server outside the vehicle, for example, via the DCM 30 mounted on the vehicle 2 or via the user terminal 202 and the short-range communication device 42.

When the update data is downloaded, the user is notified about the progress of the download. When similar download progress notifications are given for cases where the software is downloaded from the data center 100 to the ECU 10 via the DCM 30 and where the software is downloaded from the data center 100 to the ECU 12 via the user terminal 202, unnecessary information may be transmitted to the user terminals about the download progress.

For example, when update data is downloaded from the data center 100 by using the DCM 30, the data center 100 notifies the user terminal 200 about information on the progress and completion of the download. Thus, the user can check the progress and completion of the download of the update data on the user terminal. When the software is downloaded via the user terminal 202, the update data is received by the user terminal 202. Therefore, when information on the progress and completion of the download is transmitted to the user terminal 202 separately from the update data, unnecessary information is transmitted to the user terminal 202. As a result, unnecessary communication may occur, thereby increasing the communication cost and the communication load.

In the present embodiment, the control device 11 of the data center 100 reduces a data amount of information to be transmitted to the user terminal 202 about a transmission status of update data for the control program when the communication device 13 transmits the update data to the vehicle 3 via the user terminal 202, as compared to a data amount of information to be transmitted to the user terminal 200 about the transmission status when the communication device 13 transmits the update data to the vehicle 2 without intermediation of the user terminal 200.

Therefore, in the case where the communication device 13 transmits the update data to the vehicle 3 via the user terminal 202, the data amount of the information to be transmitted to the user terminal (the data amount of the information about the transmission status to be transmitted to the user terminal) is reduced as compared to the case where the communication device 13 transmits the update data to the vehicle 2 without intermediation of the user terminal 200. Thus, unnecessary communication can be reduced. Further, the communication load can be reduced. In other words, when the communication device 13 transmits the update data to the vehicle 2 without intermediation of the user terminal 200, the communication device 13 needs to transmit the update data to the vehicle 2 and transmit data on the information about the transmission status of the update data to the user terminal 200. When the communication device 13 transmits the update data to the vehicle 3 via the user terminal 202, the communication device 13 only transmits the update data to the user terminal 202. That is, in the present embodiment, the amount of data to be transmitted by the communication device 13 can be reduced.

In the present embodiment, when the communication device 13 transmits the update data to the vehicle 2 without intermediation of the user terminal 200, it is assumed that the control device 11 of the data center 100 transmits the information about the transmission status to the user terminal 200. When the communication device 13 transmits the update data to the vehicle 3 via the user terminal 202, it is assumed that the control device 11 of the data center 100 does not transmit the information about the transmission status to the user terminal 202. The information about the transmission status includes, for example, at least one of information indicating the completion of the transmission of the update data and information indicating the progress of the transmission of the update data.

Figure 2:
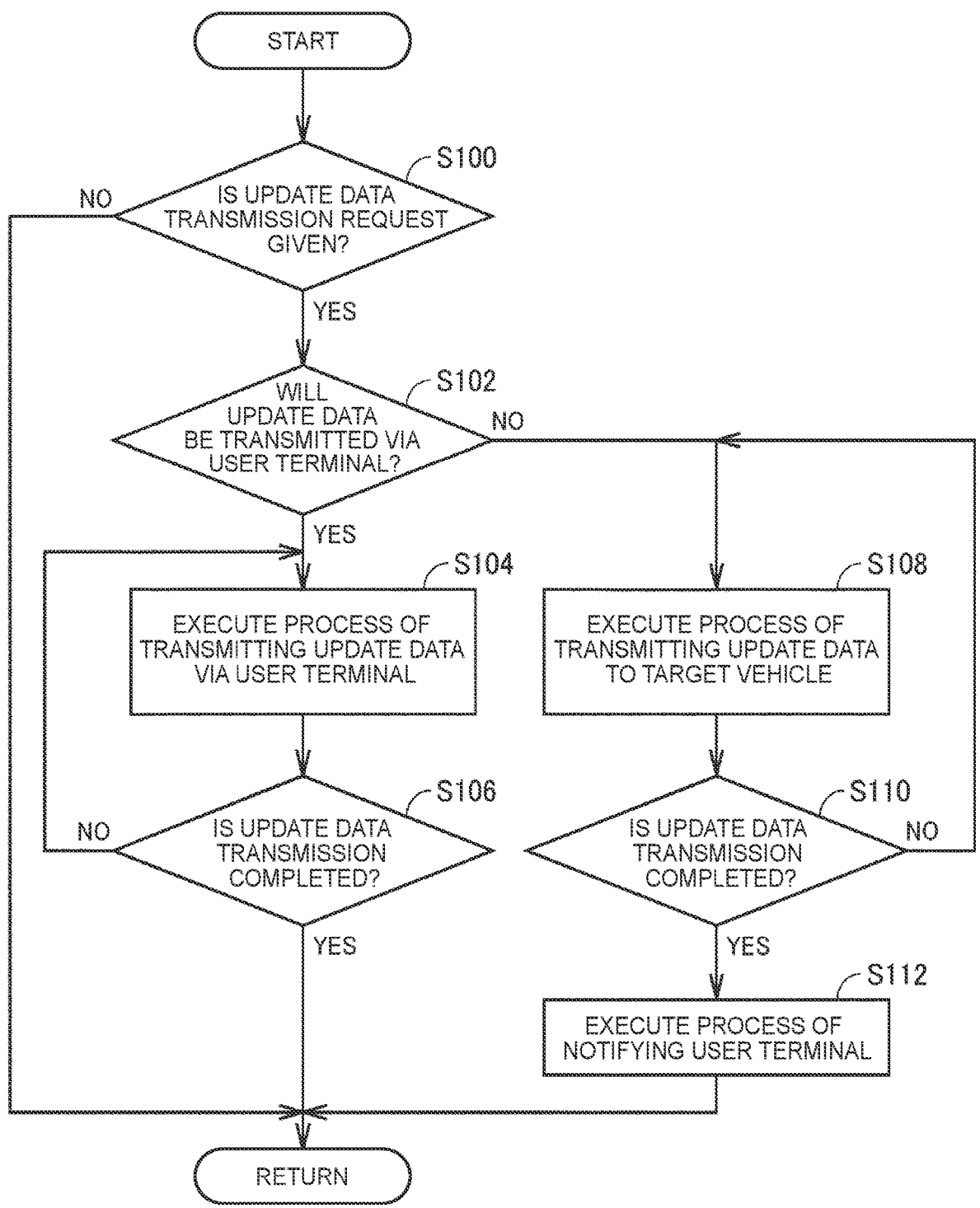
FIG. 2 is a flowchart showing an example of a process to be executed in a data center.

Hereinafter, an example of a process to be executed in the data center 100 (specifically, the control device 11) will be described with reference to FIG. 2. FIG. 2 is a flowchart showing the example of the process to be executed in the data center 100. The process shown in this flowchart is repeatedly executed by the control device 11 of the data center 100 at predetermined control cycles.

In Step S100, the data center 100 determines whether an update data transmission request is given. For example, when the data center 100 receives information indicating the update data transmission request from the ECU 10 of the vehicle 2 via the DCM 30, the data center 100 determines that the update data transmission request is given. Alternatively, when the data center 100 receives, for example, information indicating the update data transmission request for the control program of the ECU 12 of the vehicle 3 from the user terminal 202, the data center 100 determines that the update data transmission request is given. When determination is made that the update data transmission request is given (YES in Step S100), the process proceeds to Step S102.

In Step S102, the data center 100 determines whether update data will be transmitted via the user terminal. For example, when the user terminal 202 has transmitted the information indicating the update data transmission request, the data center 100 determines that the update data will be transmitted via the user terminal. When determination is made that the update data will be transmitted via the user terminal (YES in Step S102), the process proceeds to Step S104.

In Step S104, the data center 100 executes a process of transmitting the update data via the user terminal. For example, when the user terminal 202 has transmitted the information indicating the update data transmission request, the data center 100 executes a process of transmitting the update data to the user terminal 202. When the update data is received from the data center 100, the user terminal 202 transmits the received update data to the short-range communication device 42 of the vehicle 3 by using short-range communication with the vehicle 3. Then, the process proceeds to Step S106.

In Step S106, the data center 100 determines whether the update data transmission is completed. For example, when the data amount of the transmitted update data is equal to the total data amount of the update data in the case where the update data is transmitted to the user terminal 202, the data center 100 determines that the update data transmission is completed. When determination is made that the update data transmission is completed (YES in Step S106), this process is terminated. When determination is made that the update data transmission is not completed (NO in Step S106), the process returns to Step S104. When determination is made that the update data will not be transmitted via the user terminal (NO in Step S102), the process proceeds to Step S108.

In Step S108, the data center 100 executes a process of transmitting the update data to a target vehicle. For example, when the DCM 30 of the vehicle 2 has transmitted the information indicating the update data transmission request, the data center 100 executes a process of transmitting the update data to the DCM 30. Then, the process proceeds to Step S110.

In Step S110, the data center 100 determines whether the update data transmission is completed. The method for determining whether the transmission is completed is the same as the method described in Step S106. Therefore, detailed description of the method for determining whether the transmission is completed in Step S110 will not be repeated. When determination is made that the update data transmission is completed (YES in Step S110), the process proceeds to Step S112.

In Step S112, the data center 100 executes a process of notifying the user terminal. For example, when the DCM 30 has transmitted the information indicating the update data transmission request, a notification process is executed so that the user terminal 200 owned by the user of the vehicle 2 including the DCM 30 is notified of information indicating that the update data transmission is completed. The data center 100 executes the notification process with the user terminal 200 associated with the vehicle ID of the vehicle 2 as a notification target. When determination is made that the update data transmission is not completed (NO in Step S110), the process returns to Step S108. When determination is made that the update data transmission request is not given (NO in Step S100), this process is terminated.

Figure 3:
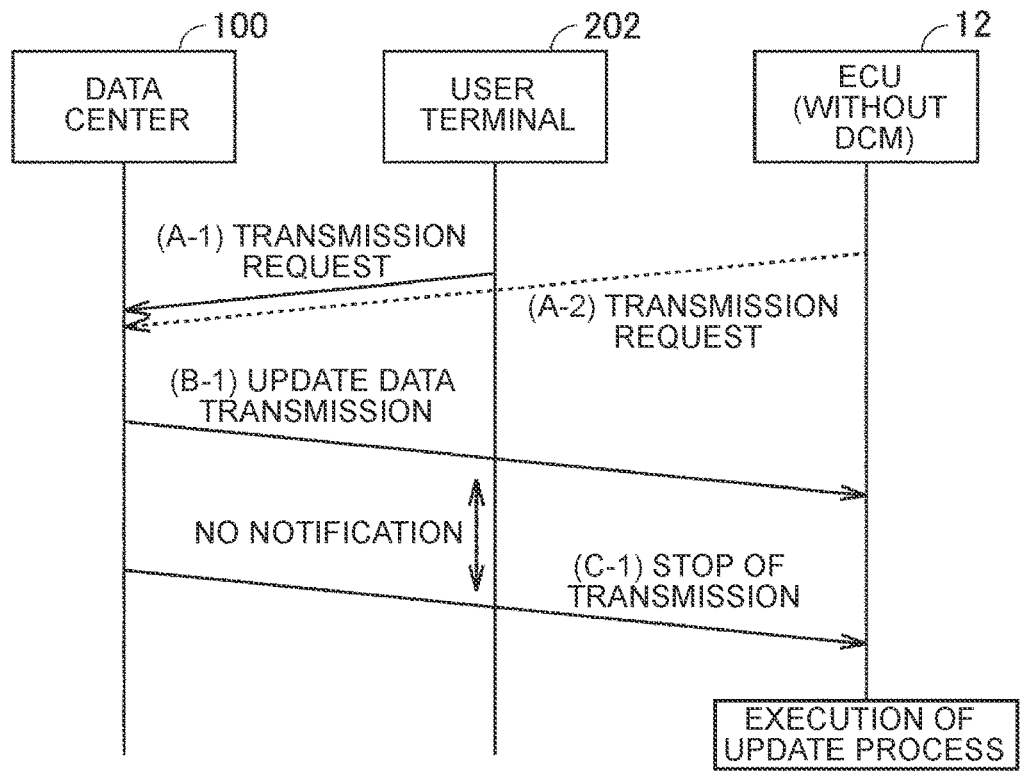
FIG. 3 shows an example of operations of the data center, a user terminal, and an electronic control unit (ECU) when updating a control program of a vehicle that does not include a DCM.
Figure 4:
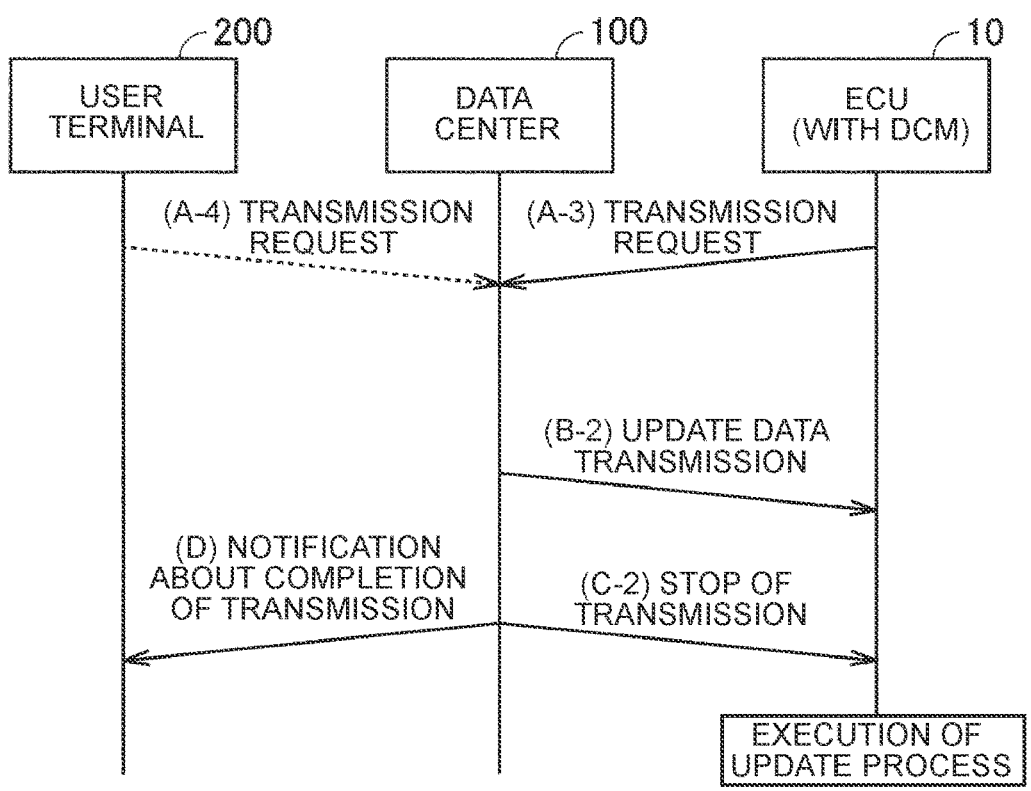
FIG. 4 shows an example of operations of the data center, the user terminal, and the ECU when updating the control program of the vehicle that includes the DCM.

The operation of the data center 100 based on the structure and the flowchart described above will be described with reference to FIGS. 3 and 4. FIG. 3 shows an example of operations of the data center 100, the user terminal 202, and the ECU 12 when the control program of the vehicle 3 that does not include the DCM is updated. FIG. 4 shows an example of operations of the data center 100, the user terminal 200, and the ECU 10 when the control program of the vehicle 2 that includes the DCM 30 is updated. The vehicle 3 may be a vehicle that includes the DCM but does not use the DCM when the control program is updated.

Update of Control Program of Vehicle 3

For example, it is assumed that information indicating that update data for the control program stored in the memory 12b of the ECU 12 can be downloaded from the data center 100 is acquired by an operation of an application or the like in the user terminal 202. The information indicating that the update data can be downloaded can be viewed by the user, for example, by being displayed on a display unit of the user terminal 202.

After the user views the information displayed on the display unit of the user terminal 202 and indicating that the update data can be downloaded, the user performs an operation of downloading the update data to the ECU 12 of the vehicle 3 via the user terminal 202, or makes a setting to download the update data at a predetermined time. In response to the download operation or in response to arrival at the predetermined time, information indicating an update data transmission request is transmitted from the user terminal 202 to the data center 100 as shown in (A-1) of FIG. 3.

When the information indicating the update data transmission request is received (YES in Step S100), the data center 100 determines whether the update data will be transmitted via the user terminal (Step S102). When determination is made that the update data will be transmitted via the user terminal 202 (YES in Step S102), the process of transmitting the update data via the user terminal 202 is executed as shown in (B-1) of FIG. 3 (Step S104). When determination is made that the update data transmission is completed (YES in Step S106), the update data transmission is stopped as shown in (C-1) of FIG. 3. The notification about the transmission status of the update data using information from the data center 100, the notification about the completion of the update data transmission using information from the data center 100, or the like is not given to the user terminal 202. The user terminal 202 can acquire the total amount and the reception status of the received update data. Therefore, the user terminal 202 may be given a notification based on such information.

When the update data reception is completed, the ECU 12 executes a process of updating the control program. The transmission request is not only given by the operation on the user terminal 202 but may also be given, for example, to the data center 100 from the ECU 12 via the user terminal 202 as shown in (A-2) of FIG. 3.

Update of Control Program of Vehicle 2

For example, it is assumed that information indicating that update data for the control program stored in the memory 10b of the ECU 10 of the vehicle 2 can be downloaded from the data center 100 is acquired by the ECU 10 via the DCM 30. In this case, in response to the acquisition of the information or at a predetermined update timing, the ECU 10 transmits information indicating an update data transmission request to the data center 100 as shown in (A-3) of FIG. 4.

When the information indicating the update data transmission request is received (YES in Step S100), the data center 100 determines whether the update data will be transmitted via the user terminal (Step S102). When determination is made that the update data will not be transmitted via the user terminal (NO in Step S102), the process of transmitting the update data from the data center 100 to the DCM 30 of the vehicle 2 that is a target vehicle is executed as shown in (B-2) of FIG. 4 (Step S108). When the update data transmission is completed, the update data transmission is stopped as shown in (C-2) of FIG. 4. When determination is made that the update data transmission is completed (YES in Step S110), the data center 100 executes the process of notifying the user terminal 200 of the completion of the transmission as shown in (D) of FIG. 4 (Step S112). As a result, the user terminal 200 uses the information from the data center 100 to give a notification about the completion of the update data transmission. The transmission request is not only transmitted from the ECU 10 to the data center 100 but may also be given, for example, from the user terminal 200 to the data center 100 as shown in (A-4) of FIG. 4.

As described above, according to the communication system 1 of the present embodiment, in the case where the communication device 13 transmits the update data to the vehicle 3 via the user terminal 202, the data amount of the information to be transmitted to the user terminal (the data amount of the information about the transmission status, to be transmitted to the user terminal) is reduced as compared to the case where the communication device 13 transmits the update data to the vehicle 2 without intermediation of the user terminal 200. In particular, the control device 11 transmits the information about the transmission status to the user terminal 200 when the communication device 13 transmits the update data to the vehicle 2 without intermediation of the user terminal 200, but does not transmit the information about the transmission status to the user terminal 202 when the communication device 13 transmits the update data to the vehicle 3 via the user terminal 202. As a result, unnecessary communication can be reduced and the communication load can be reduced. Thus, it is possible to provide a communication system, a server, a method for controlling the communication system, and a non-transitory storage medium in which unnecessary communication is reduced for downloading the update software to reduce the communication load.

Modifications will be described below. In the above embodiment, description has been given of the exemplary case where processes are executed by using one processor 11a and one memory 11b in the control device 11 of the data center 100. The process in the flowchart shown in FIG. 2 may be executed by one or more processors reading and executing programs stored in one or more memories.

In the above embodiment, the update data for the control program of the ECU 10 has been described as the example of the download target, but the download target may be update data for map information and a control program of the navigation system. The download target is not particularly limited.

In the above embodiment, when the communication device 13 transmits the update data to the vehicle 2 without intermediation of the user terminal 200, the control device 11 transmits the information about the transmission status to the user terminal 200. When the communication device 13 transmits the update data to the vehicle 3 via the user terminal 202, the control device 11 does not transmit the information about the transmission status to the user terminal 202. Thus, the data amount is reduced. However, the following configuration may be used. For example, when the communication device 13 transmits the update data to the vehicle 2 without intermediation of the user terminal 200, the control device 11 transmits, as the information about the transmission status, information indicating the completion of the update data transmission and information indicating the progress of the update data transmission to the user terminal 200. When the communication device 13 transmits the update data to the vehicle 3 via the user terminal 202, the control device 11 may transmit, as the information about the transmission status, any one of the information indicating the completion of the update data transmission and the information indicating the progress of the update data transmission to the user terminal 202.

A part or all of the above modifications may be combined as appropriate. The embodiment disclosed herein should be construed as illustrative in all respects and not restrictive. The scope of the present disclosure is shown by the claims rather than by the above description and is intended to include all modifications within the meaning and scope equivalent to the claims.

What is claimed is:

1. A communication system comprising:
a vehicle including a control device configured to store a control program;
a terminal configured to give a notification of predetermined information; and
a server configured to:
determine whether update data for the control program is transmitted to the vehicle via the terminal or the update data is transmitted to the vehicle without intermediation of the terminal,
(i) in response to determining that the update data is transmitted to the vehicle via the terminal,
transmit the update data to the terminal, and
transmit, to the terminal, first information about a transmission status of the update data transmitted from the server to the vehicle via the terminal with a first data amount, and (ii) in response to determining that the update data is transmitted to the vehicle without intermediation of the terminal, transmit the update data to the vehicle without intermediation of the terminal, and transmit, to the terminal, second information about the transmission status of the update data transmitted from the server to the vehicle without intermediation of the terminal with a second data amount, wherein the first data amount with which the first information is transmitted from the server to the terminal in a case that the server transmits the update data to the vehicle via the terminal is smaller than the second data amount with which the second information is transmitted from the server to the terminal in a case that the server transmits the update data to the vehicle without intermediation of the terminal.

2. The communication system according to claim 1, wherein the information about the transmission status includes at least one of information indicating completion of transmission of the update data and information indicating progress of the transmission of the update data.

3. A server comprising one or more processors configured to:

communicate with a vehicle including a control device configured to store a control program and a terminal configured to give a notification of predetermined information;

determine whether update data for the control program is transmitted to the vehicle via the terminal or the update data is transmitted to the vehicle without intermediation of the terminal;

(i) in response to determining that the update data is transmitted to the vehicle via the terminal, transmit the update data to the terminal, and transmit, to the terminal, first information about a transmission status of the update data transmitted from the server to the vehicle via the terminal with a first data amount; and (ii) in response to determining that the update data is transmitted to the vehicle without intermediation of the terminal, transmit the update data to the vehicle without intermediation of the terminal, and transmit, to the terminal, second information about the transmission status of the update data transmitted from the server to the vehicle without intermediation of the terminal with a second data amount, wherein the first data amount with which the first information is transmitted from the server to the terminal in a case that the server transmits the update data to the vehicle via the terminal is smaller than the second data amount with which the second information is transmitted from the server to the terminal in a case that the server transmits the update data to the vehicle without intermediation of the terminal.

4. A method for controlling a communication system including, a vehicle including a control device configured to store a control program and a terminal configured to give a notification of predetermined information, the method comprising:

determining whether update data for the control program is transmitted to the vehicle via the terminal or the update data is transmitted to the vehicle without intermediation of the terminal;

(i) in response to determining that the update data is transmitted to the vehicle via the terminal, transmitting the update data to the terminal, and transmitting, to the terminal, first information about a transmission status of the update data transmitted from the server to the vehicle via the terminal with a first data amount; and (ii) in response to determining that the update data is transmitted to the vehicle without intermediation of the terminal, transmitting the update data to the vehicle without intermediation of the terminal, and transmitting, to the terminal, second information about the transmission status of the update data transmitted from the server to the vehicle without intermediation of the terminal with a second data amount, wherein the first data amount with which the first information is transmitted from the server to the terminal in a case that the server transmits the update data to the vehicle via the terminal is smaller than the second data amount with which the second information is transmitted from the server to the terminal in a case that the server transmits the update data to the vehicle without intermediation of the terminal.

5. A non-transitory storage medium storing instructions that are executable by one or more processors mounted on the communication system and that cause the one or more processors to perform the method for controlling the communication system according claim 4.

* * * * *